Oct. 14, 1958 W. D. NOVAK 2,855,999
PUNCH PRESS
Filed April 10, 1956 9 Sheets-Sheet 1

INVENTOR.
WARREN D. NOVAK
BY H. S. Mackey
ATTORNEY

Oct. 14, 1958 W. D. NOVAK 2,855,999

PUNCH PRESS

Filed April 10, 1956 9 Sheets-Sheet 2

INVENTOR.
WARREN D. NOVAK
BY H. A. Mackey
ATTORNEY

PUNCH PRESS

INVENTOR.
WARREN D. NOVAK
BY
H. S. Mackay
ATTORNEY

Oct. 14, 1958 W. D. NOVAK 2,855,999

PUNCH PRESS

Filed April 10, 1956 9 Sheets-Sheet 4

INVENTOR.
WARREN D. NOVAK

BY H. S. Mackey
ATTORNEY

INVENTOR.
WARREN D. NOVAK
BY
H. L. Mackey
ATTORNEY

Oct. 14, 1958 W. D. NOVAK 2,855,999

PUNCH PRESS

Filed April 10, 1956 9 Sheets-Sheet 6

INVENTOR.
WARREN D. NOVAK
BY
H. L. MacKay
ATTORNEY

Oct. 14, 1958 W. D. NOVAK 2,855,999

PUNCH PRESS

Filed April 10, 1956 9 Sheets-Sheet 7

INVENTOR.
WARREN D. NOVAK
BY
H. L. Mackey
ATTORNEY

Oct. 14, 1958 W. D. NOVAK 2,855,999

PUNCH PRESS

Filed April 10, 1956 9 Sheets-Sheet 8

INVENTOR.
WARREN D. NOVAK

BY H. L. Mackay
ATTORNEY

INVENTOR.
WARREN D. NOVAK
BY H. S. Mackey
ATTORNEY

United States Patent Office 2,855,999

Patented Oct. 14, 1958

2,855,999

PUNCH PRESS

Warren D. Novak, Chappaqua, N. Y., assignor to General Precision Laboratory Incorporated, a corporation of New York Application April 10, 1956, Serial No. 577,350

18 Claims. (Cl. 164—114)

This invention relates to a punch press and particularly to a punch press capable of punching a large variety of patterns and which requires very little set-up time to change the pattern.

Manufacturers of electronic equipment are presently making wide use of printed circuit techniques in which a sheet of insulating material, or "board," is used to mount various components and in which the electrical connections between components, and sometimes certain components themselves, are "printed" in copper on the board by various methods. The components, such as resistors and capacitors, are normally mounted on one side of the board by passing their lead wires through suitably placed holes in the board and by dip soldering the leads to the copper circuit on the other side of the board.

Each separate circuit usually requires its own pattern of holes to accommodate the particular components and in quantity production it is desirable that an economical way be found to pierce a large number of boards with each pattern. Hand drilling with a drill press is obviously too expensive and therefore a punch press comes next to mind.

Paper cards having selected patterns of holes have been used for many years to control various devices such as looms and accounting machines, and many different punches have been developed to punch a selected pattern of holes or to duplicate a card from a previously punched master card. It might be thought at first that a card punching machine could be used for punching printed circuit boards but consideration of the forces required to punch a standard printed circuit board, such as one made of a phenolic plastic 1/16" thick, immediately reveals the need for a sturdier machine. Most machines for duplicating a card from a master have an intricate mechanism of sensing pins, punches, and locking bars. If each component of such a mechanism were strengthened sufficiently to allow phenolic plastic boards to be punched it would be found that the bulk of the parts would dictate a wide spacing between adjacent punches. Even if this were done it would be necessary to replace the small electric motor usually used with a unit capable of exerting the large force required.

A number of punch presses have been constructed in the past for piercing printed circuit boards but all of them have had the disadvantage that a large amount of engineering, clerical and mechanical time has been required to set, or "program" the machine for each pattern. When it is realized that each product to be manufactured usually requires many different printed circuits, it becomes apparent that a reduction in set-up time would greatly reduce the manufacturing cost of the product.

It is a general object of this invention to provide a punch press capable of punching a large variety of patterns of holes.

A more specific object is to provide a punch press in which the pattern of holes to be punched can be established quickly.

Another object is to provide a punch press in which all of the holes required to be punched in a work piece may be punched simultaneously.

Another object is to provide a punch press in which the pattern may include holes spaced close together.

A further object is to provide a punch press capable of punching holes in a standard printed circuit board.

Briefly stated, a punch press according to the invention comprises many individual punches arranged in a grid pattern with one punch in each position that could require a hole. Each punch is normally biased to an active position but may be moved against the action of its individual spring to an inactive position. To set up the machine, one sample board is drilled manually and placed on the lower die beneath the punches. The lower die is raised, preferably by means of a hydraulically operated piston, and those punches which encounter a hole pass through the sample board and remain in their active positions while those punches which lie above an undrilled portion of the board are raised by the board to their inactive positions. A locking mechanism is next inserted which holds each punch in its selected position. The die may now be lowered, the sample removed, and the machine is ready to start production.

For a clearer understanding of the invention reference may be made to the following detailed description and the accompanying drawing in which.

Figure 16:
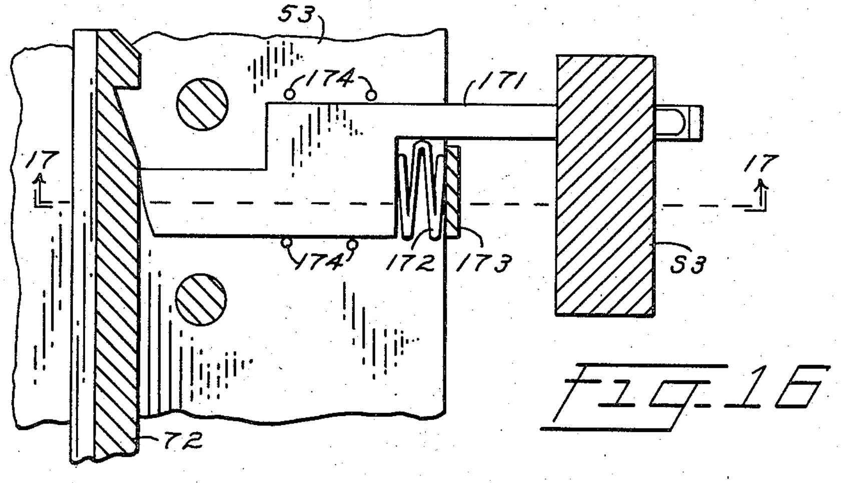

Figure 16 is a fragmentary sectional view taken from above with the upper plate 25, the spring retainer plate 51 and the spring plate 52 removed, showing the switch S3 and its operating mechanism.

Figure 17:
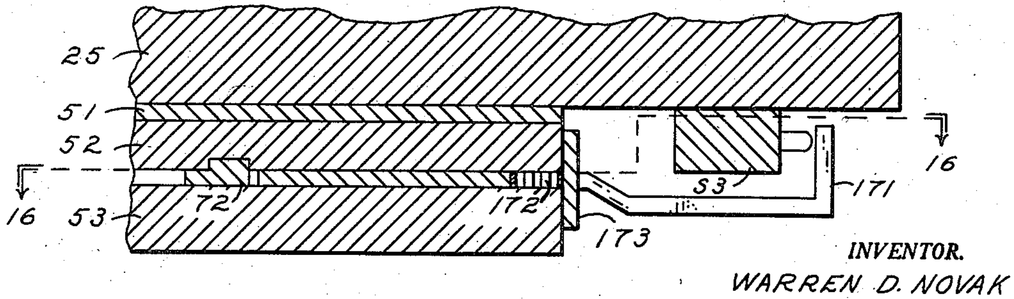
Figure 19:
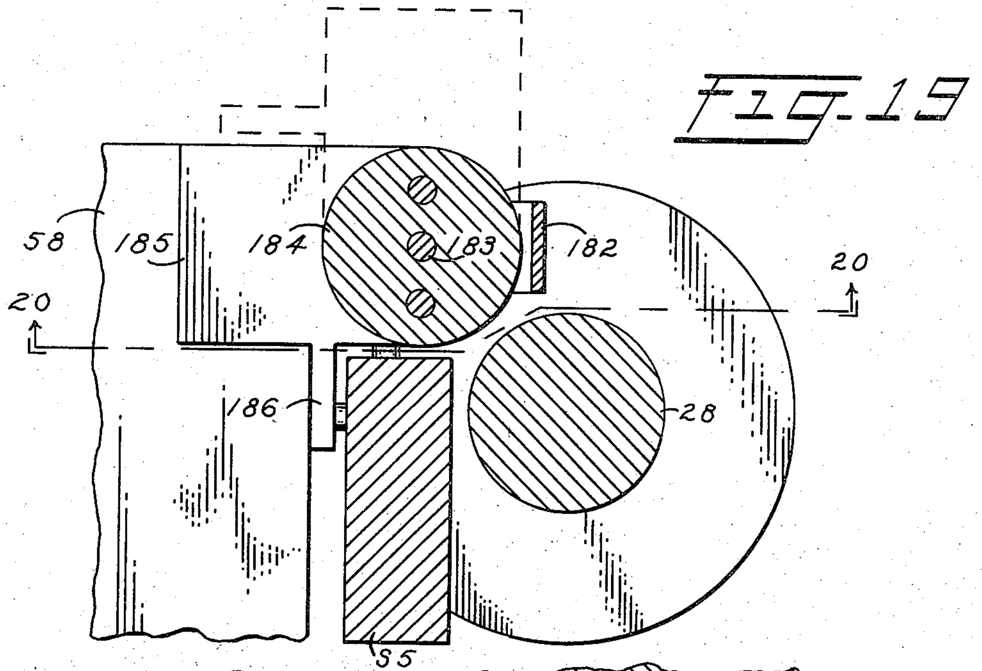
Figure 20:
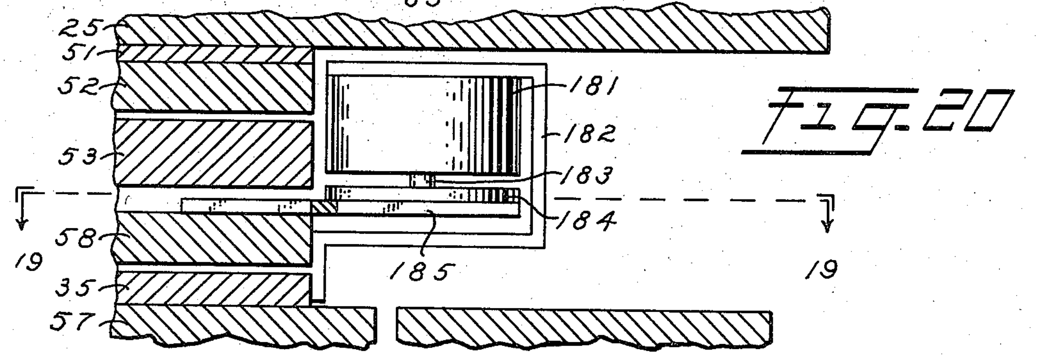
Figure 18:
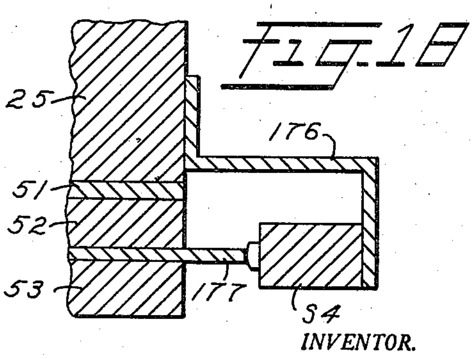
Figure 21:
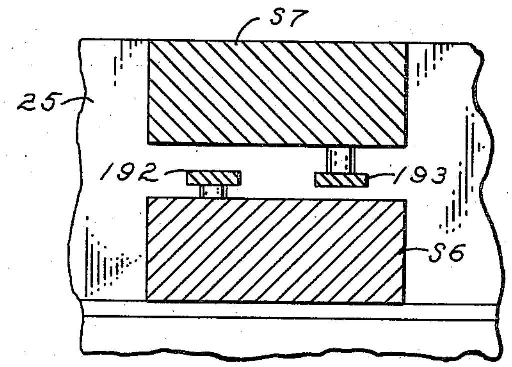
Figure 22:
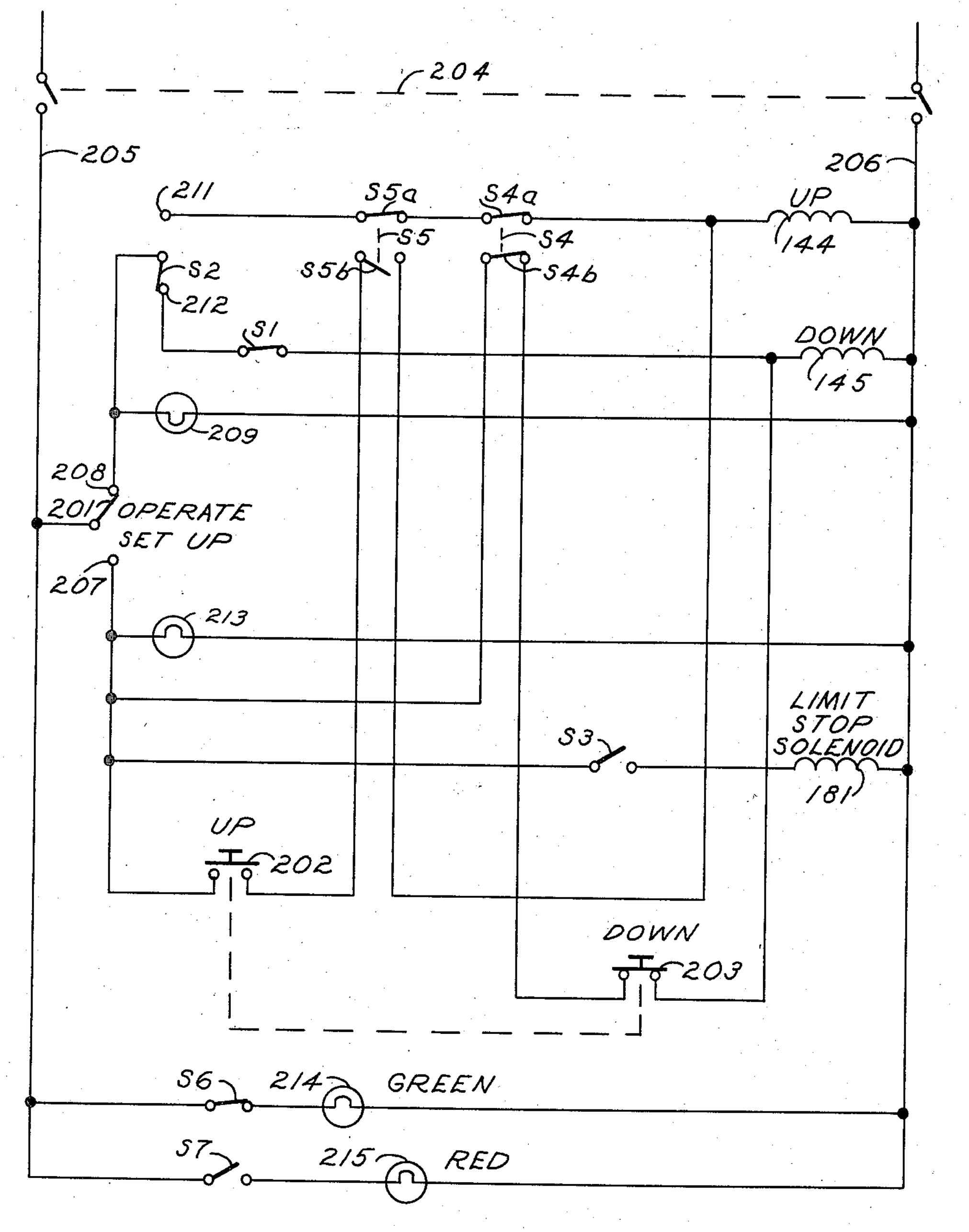

Figure 17 is a fragmentary sectional view taken on the line 17—17 of Fig. 16;

Figure 18 is a fragmentary vertical cross sectional view showing the switch S4 and its mode of actuation;

Figure 19 is a fragmentary horizontal sectional view showing the switch S5 and its mode of actuation by the limit stop plate;

Figure 20 is a fragmentary vertical sectional view taken on the line 20—20 of Fig. 19 showing one of the rotary solenoids;

Figure 21 is a fragmentary vertical sectional view through the switches S6 and S7 showing their actuation; and Figure 22 is a circuit diagram of the electrical connections.

Figure 1:
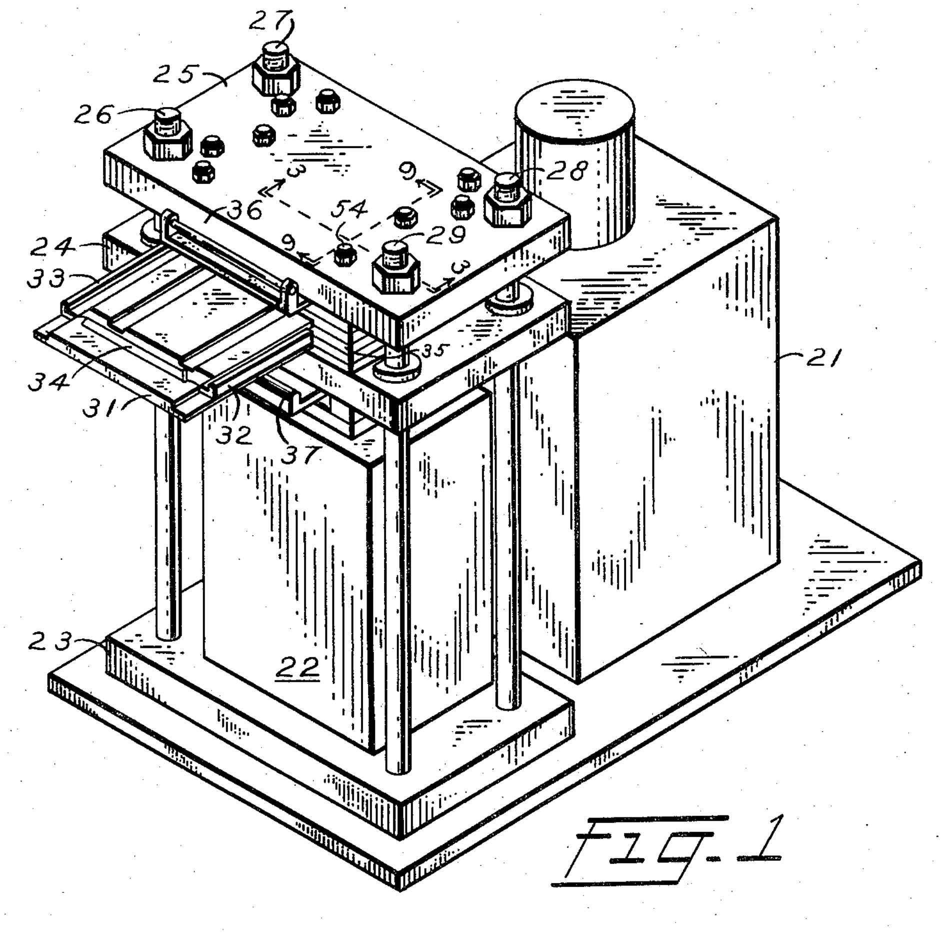
Figure 1 is a pictorial view of the entire machine.

Referring first to Fig. 1, there is shown the outline of a conventional oil pump 21 which maintains a predetermined oil pressure and which is connected by suitable piping and control valves to a conventional hydraulic cylinder and piston the outline of which is shown at 22. A four post die set comprising a lower plate 23, a shoe plate 24, an upper plate 25 and four posts 26, 27, 28 and 29, has its shoe plate 24 raised and lowered by the piston 22, the control mechanism for which will be described subsequently. The invention is concerned principally with the punches, the die, and the associated apparatus which is located between the plates 24 and 25 and which will be fully described with the aid of the remaining figures of the drawing. However, there can be seen in Fig. 1 a table plate 31 which serves as a sort of desk and which remains in the position shown at all times. A right slide 32 and a left slide 33 are joined by a handle 34 and slide in channels on the edges of the table plate 31 and in grooves in the die plate 35. A bar 36 is shown which enables the keys holding the punches in place to be inserted or withdrawn. A chad box 37 is placed below the shoe plate 24 for collecting the chads.

The operation of the apparatus shown in Fig. 1 may be somewhat sketchily described. It will be assumed that the punches have been set to their proper positions and that the locking keys have been inserted as shown by the position of bar 36 thereby locking the punches in position. The operator may now place an unpunched board on the slides 32 and 33, positioning it by means of dowel pins which fit through index holes in the edges of the board and corresponding holes in the slides. The board is next inserted into the machine by pushing the handle 34 all the way in. The piston 22 is now operated automatically through one cycle of movement, up and back down. The handle 34 is pulled out, the completely punched board removed, another board inserted, and the operation repeated.

Figure 2:
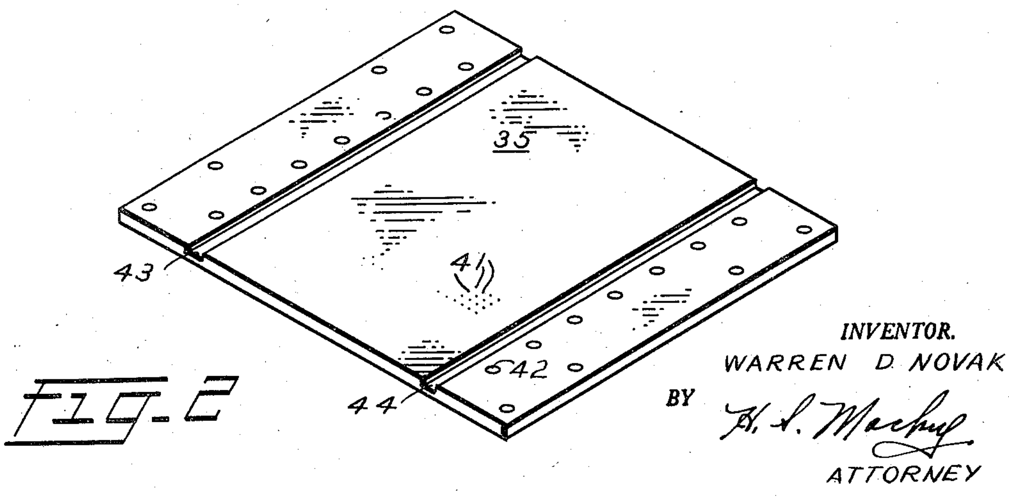
Figure 2 is a view of the die plate.

Referring now to Fig. 2, there is shown a view of the die plate 35 which comprises a generally rectangular plate having a grid pattern of small holes, a few of which are shown at 41. By way of example, the die plate 35 may be about 12 x 14 inches and the holes 41 may be about 0.055 inch in diameter and arranged in a rectangular pattern of 81 rows and 61 columns, spaced 0.100 inch on centers. The die plate has a plurality of holes, such as 42, on each side for fastening the die plate to the remaining plates. Two grooves 43 and 44 are formed in the top of the plate to accommodate the slides 32 and 33 (Fig. 1) as will be more fully explained.

Figure 3:
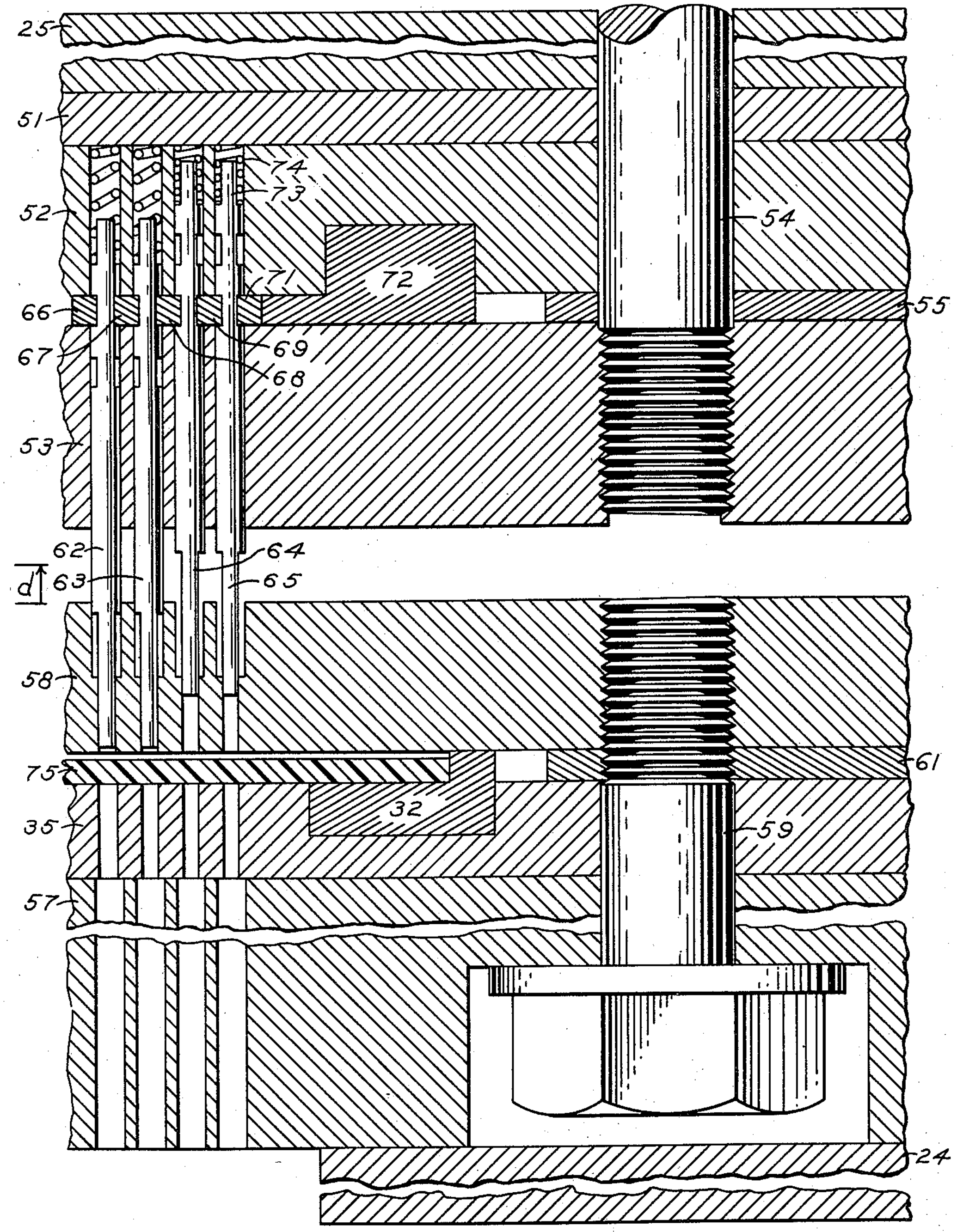
Figure 3 is a fragmentary cross sectional view taken on the line 3—3 of Fig. 1.

Referring now to Fig. 3, there is shown a spring retainer plate 51, a spring plate 52 and a body plate 53. These plates are fastened to the upper plate 25 of the four post die set by means of a plurality of bolts threaded into the body plate 53, one of which is shown at 54. The plates 52 and 53 are maintained spaced apart by means of two spacers, one on each side of the assembly, one of which, spacer 55, is shown in Fig. 3.

A base plate 57, the die plate 35 and a stripper plate 58 are fastened together by means of a plurality of bolts such as 59 threaded into the stripper plate. The die plate 35 and the stripper plate 58 are spaced apart by means of two spacers, one on each side of the assembly, one of which is shown at 61. The shoe plate 24 of the die set bears against the base plate 57 and is fastened thereto by a plurality of bolts (not shown).

Each of the plates 52, 53, 57 and 58 has holes arranged in a grid pattern coaxial with the holes 41 in the die plate 35. Each hole is provided with a punch, four of which, punches 62, 63, 64 and 65, are shown in Fig. 3. As shown in the drawing, each punch is formed with one end having a diameter just slightly smaller than that of the holes 41 in the die plate 35. For example, if the holes 41 in the die plate are 0.0550 inch in diameter, the active end of the punches may be 0.0520 inch in diameter. The body portion of each punch is preferably larger in diameter, and in the specific embodiment illustrated, is made 0.0785 inch in diameter. The body portion of each punch has two portions of reduced diameter for cooperation with keys such as keys 66, 67, 68, 69 and 71 which hold each punch in one of two selected positions, i. e., either a lower, active position or an upper, inactive position. The keys fit between the punches and between the spring plate 52 and the body plate 53. As shown in the drawing, the punches 62 and 63 are being held in their lower, active, positions while the punches 64 and 65 are held in their upper, inactive, positions. There can also be seen one of the key guides 72 which slides in a corresponding groove in the spring retainer plate 52 and about which more will be said later. Each punch has an upper projection, such as the projection 73 of the punch 65, around which is placed a coil spring, such as 74, which acts between the top of the punch and the bottom of the spring retainer plate 51 so as to urge the punches downward. These springs have no effect in the punching operation but are to assist in setting up the machine.

The stripper plate 58 has holes of sufficient size to accommodate the active portion of the punch all the way through and is counterbored about half way so as to accommodate the body portion of the punch. The spacer 61 holds the stripper plate 58 and the die plate 35 far enough apart so that the work piece, that is, the unpunched printed circuit board 75, can be inserted between them. The board 75 may, for example, be of standard $\frac{1}{16}$ inch thickness and is shown resting on the right slide 32 and the die plate 35. The base plate 57 transfers the thrust from the shoe plate 24 to the die plate 35 and has holes slightly larger than those in the die plate 35 so that the chads will drop through readily.

In operation, the board 75 is inserted as shown and the hydraulic piston operated to raise the shoe plate 24, and consequently the base plate 57, the die plate 35 and the stripper plate 58. The board 75 is forced against the punches 62 and 63, and, since all the punches are held stationary by the keys 66, 67, 68, 69 and 71, holes are punched in the board by punches 62 and 63. The hydraulic piston 22 is controlled to raise the assembly a distance *d* which may, for example, be 0.100 inch, so that holes are punched by punches 62 and 63 but not by punches 64 and 65. The assembly is next lowered to the position shown in the drawing during which time the board 75 is dragged by the punches into close contact with the stripper plate 58 which strips the punches 62 and 63 from the board. The completed board may now be removed and another inserted.

Figure 4:
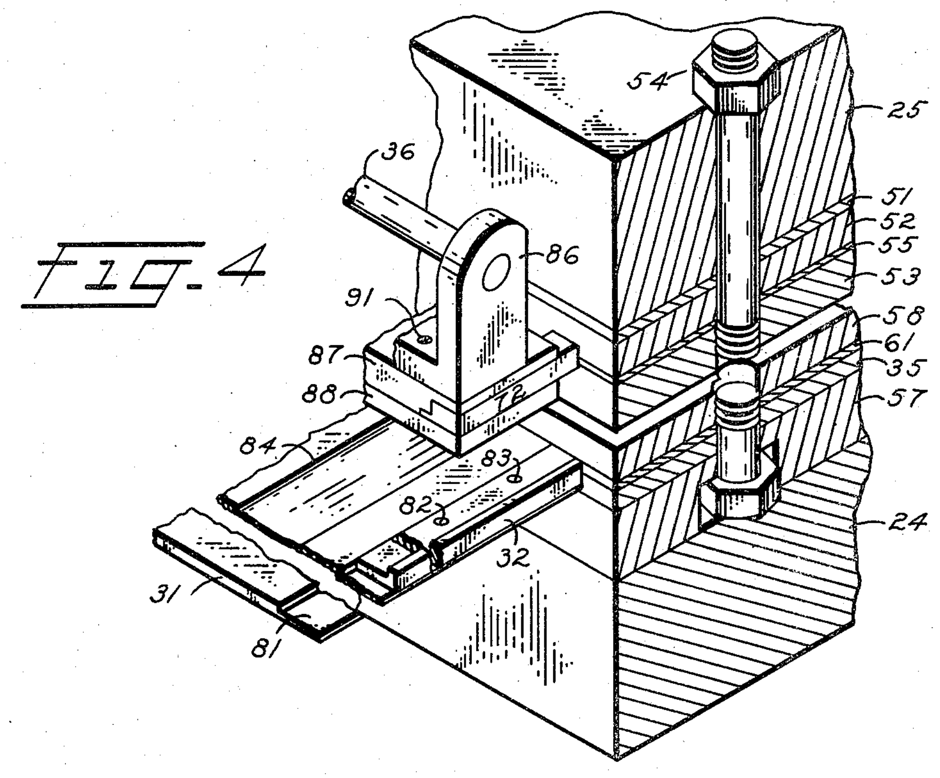
Figure 4 is a fragmentary isometric view, partly in section taken on the same plane as Fig. 1.

Fig. 4 shows the table plate, work piece slide, and the operating mechanism for the locking keys more clearly than Fig. 1. In Fig. 4 there is shown the table plate 31 having a cut away portion 81 on its right side which serves as a track for the right slide 32. The slide 32 has several index holes, two of which are shown at 82 and 83, for receiving pins which pass through two or more holes on each blank printed circuit board to enable it to be positioned accurately. The left slide 33, not shown in Fig. 4, has similar holes and slides in a similar track on the left side of the table plate 31. The handle 34 joining the two slides has been omitted from Fig. 4 in order to show the remaining parts more clearly. The table plate 31 has two shallow grooves, one of which is shown at 84, formed in its top surface to facilitate removal of the work piece when it is withdrawn from the machine oy the slides 32 and 33.

Figure 5:
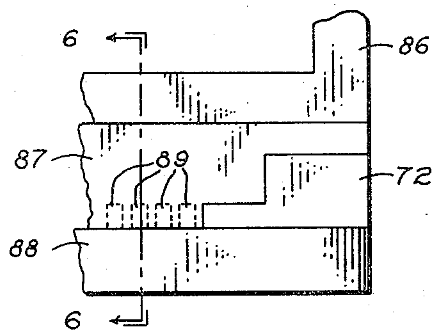
Figure 5 is an elevation view of the bracket, key spacer and key retainer shown in Fig. 4.
Figure 6:
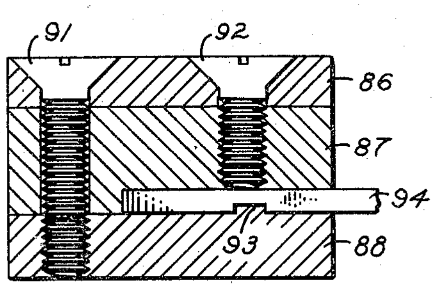
Figure 6 is a cross sectional view taken on the line 6—6 of Fig. 5.

The bar 36, by which the punch locking keys are inserted and withdrawn, is fastened to a right angle bracket 86 which is in turn fastened to an assembly comprising a key spacer 87, the right key guide 72, and a key retainer 88. Fig. 5 is an enlarged front elevation view of the assembly and shows in dashed outline a plurality of grooves 89 in the key spacer 87 which are of the proper size to hold the keys snugly in position, properly spaced apart. The grooves 89 extend from the back of the key spacer 87 about two thirds of the way to the front, as can be seen in Fig. 6. Fig. 6 also shows how the assembly is held together by a plurality of bolts, such as those shown at 91 and 92. The key retainer 88 has a projection 93 throughout the length of its upper surface which engages a corresponding groove in each key, such as key 94.

Figure 7:
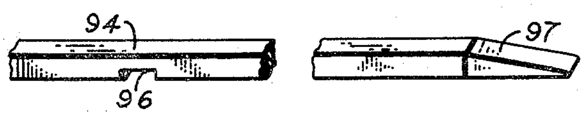
Figure 7 is a pictorial view of one of the punch locking keys.

Fig. 7 is a view of one of the keys, which is rectangular in cross section. The groove 96 cooperates with the projection 93 of the key retainer, as shown in Fig. 6. The other end of the key is tapered, as shown at 97, in order to lift the punches when the keys are inserted, as will be more fully explained. However, it can be seen from Figs. 1 and 4–7 that the keys are properly spaced by the grooves 89 in the key spacer 87; they are held longitudinally by their grooves 96 and the projection 93 on the key retainer 88; and that the keys may be inserted and withdrawn together by the bar 36.

Figure 8:
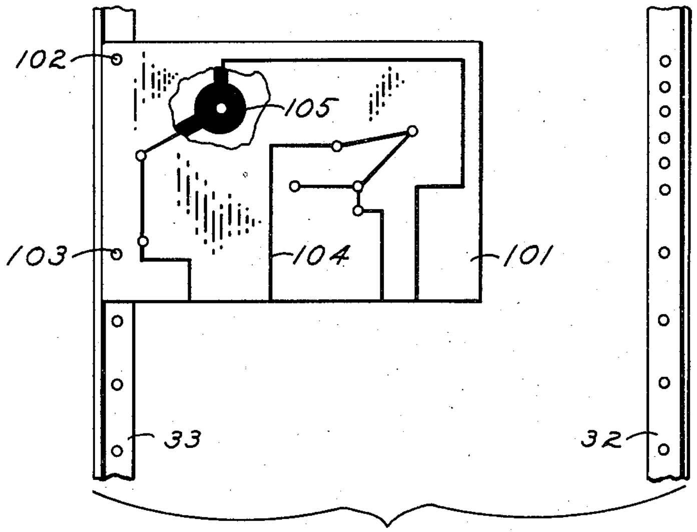
Figure 8 is a plan view of a printed circuit board and the slides for inserting the board.

Referring now to Fig. 8, there is shown a typical printed circuit board 101 together with the right slide 32 and the left slide 33 of the machine. The board 101 illustrated is comparatively small, occupying only a portion of the available working area, and is held to the left slide 33 by means of two dowels which pass through holes 102 and 103 in the board and seat in two of the holes in the left slide 33. It is apparent that the machine can accommodate other sizes of boards, either smaller or larger, up to an overall size of about 7″ x 9″ in the specific embodiment being described, with an area of about 6″ x 8″ in which holes may be punched. If the board is the full 9″ in width, it is preferable to secure it to both slide 32 and slide 33 by means of one dowel in each side. Or instead of one large board, several smaller boards may be inserted at the same time. For example, two boards may be fastened to each of the slides 32 and 33. For any size of board, the index holes may be the same holes used for handling the board throughout the entire manufacturing process, including mounting the completed circuit in the finished product.

The board 101 may be made of 1/16″ insulating material and is assumed to have had the circuit already printed on it in copper. The heavy lines such as 104 denote the conductive copper lines which connect the components which are to be mounted on the other side of the board and which connect the circuit to other elements in the finished product. At each point where a hole is to be punched and a component is to be fastened by its lead, the copper is formed into a loop, as shown in the enlarged detail at 105. All of the holes to be punched must be located on the intersection of grid lines which are composed of 81 columns and 61 rows spaced apart 0.100 inch, but since the spacing is so close no real restriction is imposed on the layout of the circuit.

*Set up*

The manner in which the machine is set up to punch the desired configuration will now be considered. Let it be assumed that the machine has been punching boards having one configuration and that it is desired to punch boards for a different circuit requiring a different configuration of holes. One board, such as that shown in Fig. 8, which has already had the circuit printed thereon in the regular course of production, is selected and all of the required holes are drilled by hand on a drill press with oversize holes. For example, if the holes in the production boards are to be about 0.050 inch, the selected board may be drilled to 0.070 or 0.075 inch. Precision drilling is not required and the centering action of the copper loop (105 of Fig. 8), which will be 0.002 or 0.003 inch high, provides sufficient accuracy. The holes may therefore be drilled quickly and a board with 50 to 100 holes should require no more than ten minutes to prepare.

With the die in its lower position, as shown in Fig. 3, the last of the old style boards is removed and the new hand drilled board inserted. The position of the parts will then be as shown in Fig. 9.

Figure 9:
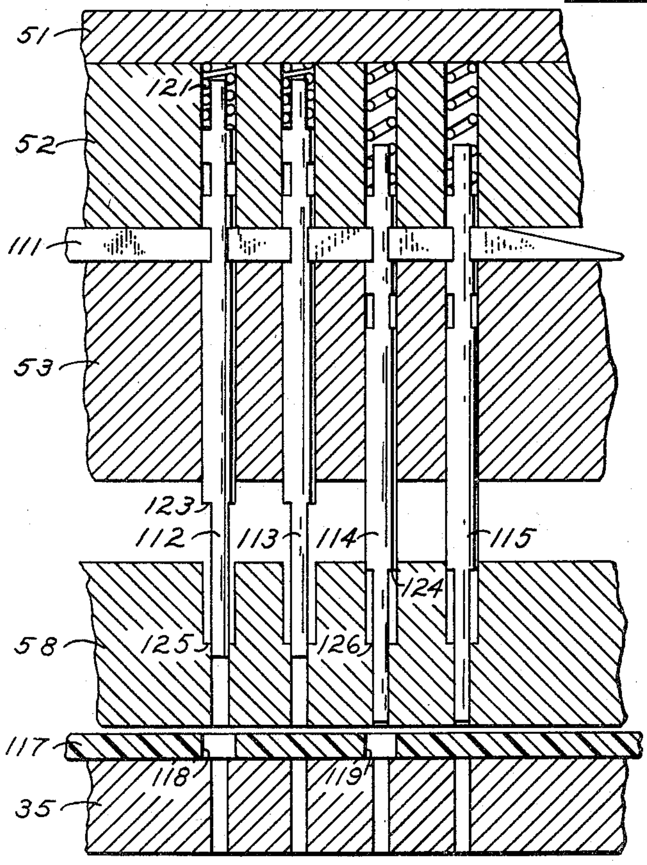
Figures 9, 10 and 11 are cross sectional views, all taken on the line 9—9 of Fig. 1 but showing the parts under different operating circumstances.

Fig. 9 is a cross section at right angles to that of Fig. 3 and, to improve the clarity, only every second punch is shown. The spring retainer plate 51, the spring plate 52, the body plate 53, the stripper plate 58 and the die plate 35 appear much as in Fig. 3. One punch locking key 111 is shown holding punches 112 and 113 in their inactive positions and punches 114 and 115 in their active positions as required by the former set up. The new board 117 has holes 118 and 119 under punches 112 and 114 and therefore requires these punches to be held in their lower, active positions, while, since there are no holes under punches 113 and 115, the punches must be set to their upper, inactive positions. In order to set the punches, all of the punch locking keys, such as key 111, are withdrawn by means of the bar 36 (shown in Figs. 1 and 4) whereupon the springs of each punch (such as the spring 121 of punch 112) will force the punches downward to the positions shown in Fig. 10.

Figure 10:
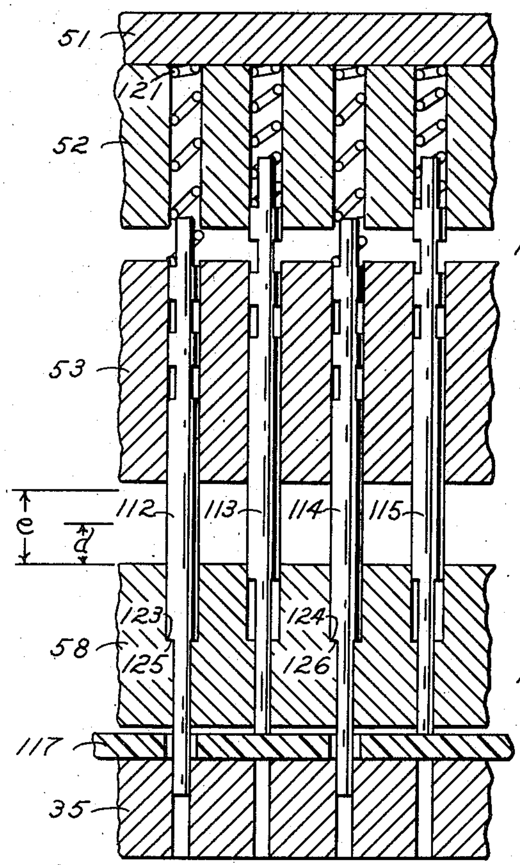

Fig. 10 shows that the punches 112 and 114 have been pushed downward through the holes in the board 117 until their shoulder portions 123 and 124 rest on the bottoms 125 and 126 of the counter bores in the stripper plate 58. The punches 113 and 115 rest on the top of the board 117 since there are no holes beneath these punches. The hydraulic piston 22 is now operated in its "set up" mode to raise the die plate 35 and the stripper plate 58 a greater distance than they are raised in the regular operating mode. In the specific embodiment being described, this distance was made 0.170 inch, as shown at $e$ in Fig. 10, in contrast to the distance $d$=0.100 inch used in the operating mode. Since the punch locking keys have been removed, the punches are held downward only by their springs and will be raised as the die plate 35 and the stripper plate 58 are raised. The punches 112 and 114 will be raised by the stripper plate 58, the counter bores 125 and 126 of which bear against the shoulder portions 123 and 124 of these punches. The punches 113 and 115 will be raised by the board 117 since the springs do not exert sufficient downward force to cause the board to be pierced.

Figure 11:
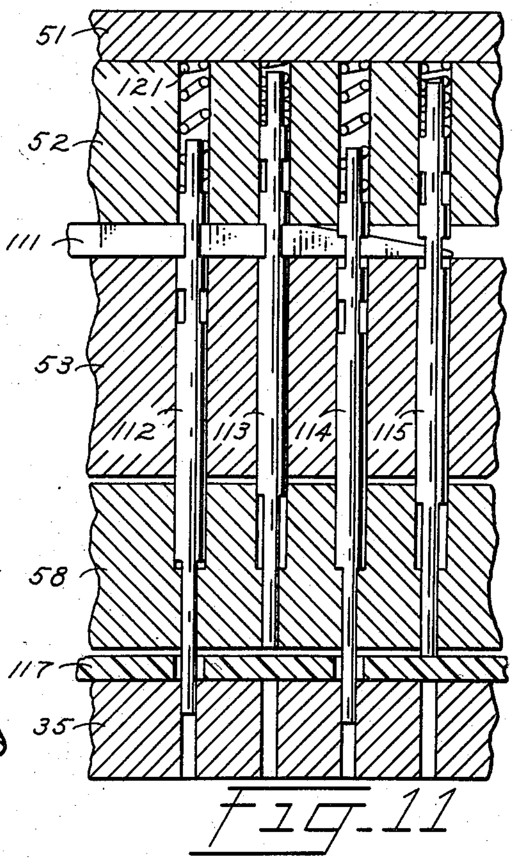

After the die 35 and stripper plate 58 are raised the distance $e$, the punch locking keys are again inserted to lock the punches in their selected positions. Fig. 11 shows the positions of the parts at this time. The punches 114 and 115 are in the positions to which the operation of the piston has raised them against their springs. The key 111 has been partially inserted and has raised the punches 112 and 113 a few thousandths of an inch and as it is inserted further, punches 114 and 115 will also be raised slightly. When fully inserted, the key 111 will lock the punches 112 and 114 in their downward, active positions and will lock punches 113 and 115 in their upward, inactive positions. The piston 22 may now be lowered, the hand drilled board removed, and the machine is ready to punch new boards.

It can be seen that the entire operation of changing the set up takes but a short time. The new board may be hand drilled in advance while the machine is still producing the old pattern. It is only necessary to take out the last of the old boards, insert the master, hand drilled board, unlock the punches by pulling out the bar 36, raise the die to its "set up" position, push in the bar 36 to lock the punches, lower the die and remove the master board. The total "down time" of the machine should not exceed one minute, and the total "set up" time, including drilling the master board, should not exceed ten minutes.

*Control mechanism-hydraulic system*

Figure 12:
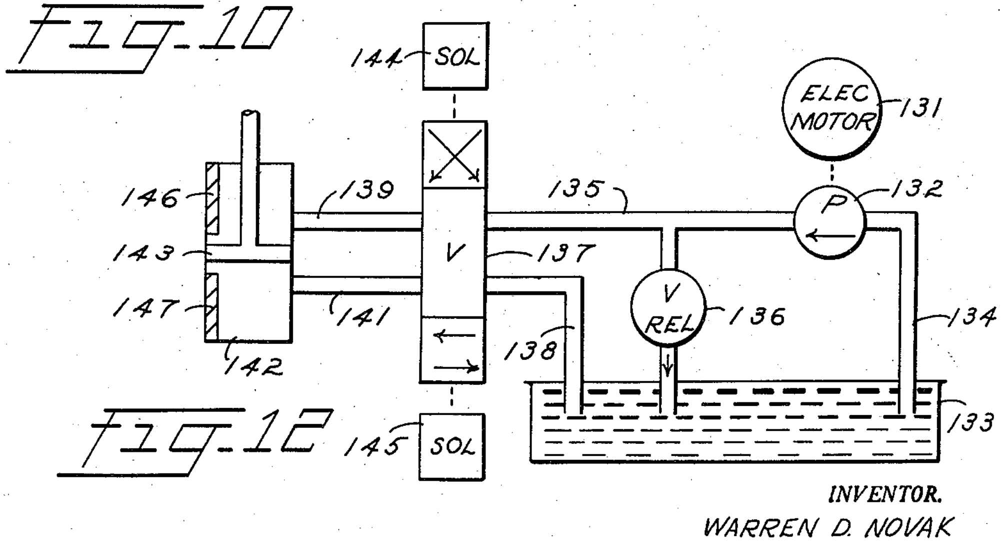
Figure 12 is a schematic diagram of the hydraulic piston actuating mechanism.

Referring now to Fig. 12, there is shown schematically the hydraulic system which furnishes the motive power for raising and lowering the die plate. An electric motor 131 which runs continuously when the machine is in use is mechanically connected to drive a fluid pump 132. The pump 132 draws fluid from a reservoir 133 through a conduit 134 and builds up pressure in a conduit 135 to a point determined by the setting of a relief valve 136 connected between the conduit 135 and the reservoir 133. A distributing valve 137 is connected to the conduit 135 and also to the conduit 138 which leads to the reservoir 133. Conduits 139 and 141 connect the distributing valve 137 to the hydraulic cylinder 142, the conduit 139 leading to the portion of the cylinder above the piston 143 and the conduit 141 leading to the portion of the cylinder below the piston 143.

The distributing valve 137, sometimes called a four way valve, is operated by two solenoids 144 and 145. When neither solenoid is energized, internal springs hold the valve in a neutral position at which, in effect, the conduit 135 is connected to the conduit 137 thereby allowing the fluid to circulate. Energization of the solenoid 144 connects the conduit 135 to the conduit 141 and also connects the conduit 138 to the conduit 139, thus causing the piston 143 to be raised. Energization of the solenoid 145 connects the conduit 135 to the conduit 139 and also connects the conduit 138 to the conduit 141, thus causing the piston 143 to be lowered. The travel of the piston 143 is limited by mechanical stops shown schematically at 146 and 147. In the specific embodiment being described, the position of the piston 143 when resting on the lower stop 147 corresponds to the lowermost position of the die plate 35, that is, the position shown in Figs. 3, 9 and 10. The uppermost position of the piston corresponds to that position of the die plate when it is raised the distance "*e*" (0.170 inch) to set the punches in their proper positions.

*Control system-switches*

Figure 13:
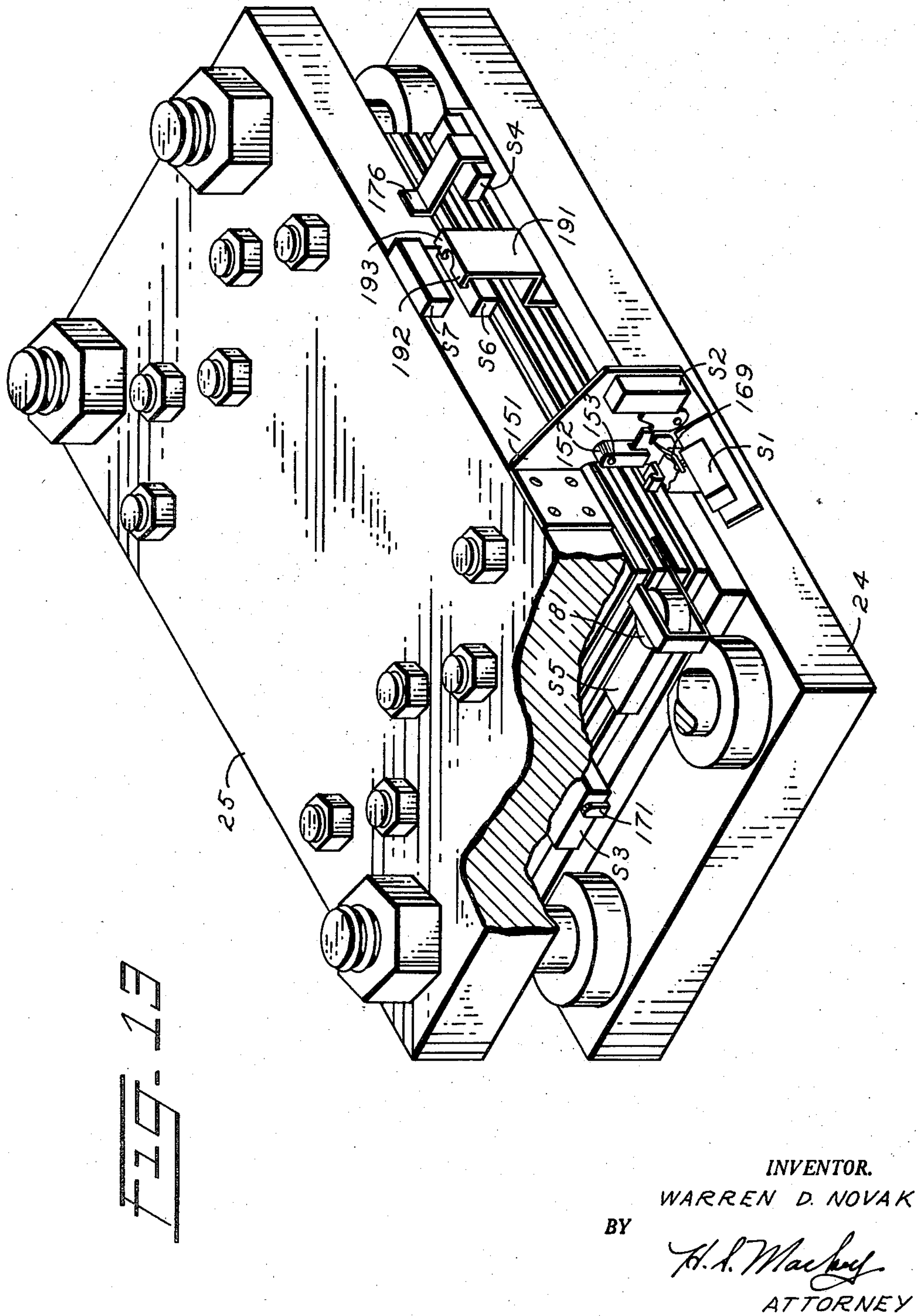
Figure 13 is an isometric view of the right rear corner of the press showing the location of the electric control elements.

The operation of the press is controlled electrically by means of a circuit including a plurality of switches. To understand the operation it is first necessary to consider the individual switches and their respective actuating mechanisms. Figure 13 is an isometric view showing the position of each switch on the press itself, while Figs. 14–21 are detailed views of the individual switches.

*Switch S2*

Figure 14:
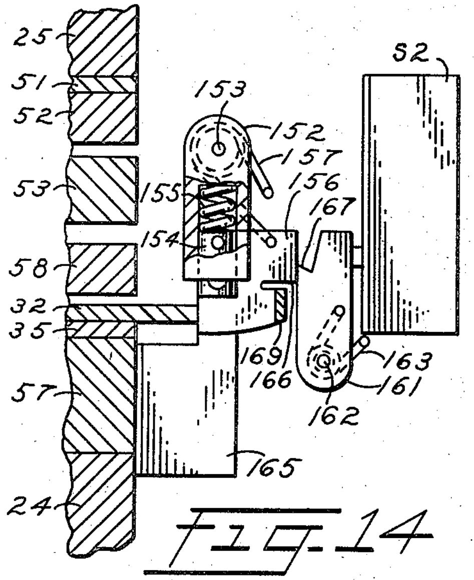
Figure 14 is a view, partly in side elevation and partly in section, showing the switch S2 and its operating mechanism.

As shown in Fig. 13, the upper plate 25 carries a bracket 151 on which are mounted switches S1 and S2 and their actuating mechanisms. The switch S2 is mounted vertically while the switch S1 is mounted at an angle of 45° as shown. A generally rectangular member 152 is pivoted about a pin 153 which in turn is supported by the bracket 151. As best shown in Fig. 14, the member 152 has a hole formed therein in which a split cylindrical plunger 154 is placed. The plunger is urged downward by a coil spring 155 bearing against the upper end of the hole. A generally rectangular plate 156 is held between the two semi-cylindrical sections of the plunger 154 and protrudes through a slot in the side of the member 152 and also extends below the plunger 154. A spring 157 is wound around the pin 153 between the member 152 and the bracket 151 and has one end fastened to the plate 156 and the other end fastened to the bracket 151 so as to urge the lower portion of the assembly to the left as seen in Fig. 14 with the pin 153 as the pivot point.

An arm 161 is pivoted about a pin 162 which is fastened to the bracket 151 and which has a spring 163 wound around it between the arm 161 and the bracket 151. One end of the spring is fastened to the arm 161 and the other end is fastened to the bracket 151 so that the upper portion of the arm 161 is urged to the left as viewed in Fig. 14. The left edge of the arm 161 bears against the right edge of the plate 156 while the right edge of the arm 161 bears against the actuating pin of the switch S2. The switch S2 is a single-pole double-throw switch and with the parts in the positions shown in Fig. 14 it is actuated.

The lower surface of the plate 156 is arcuate, the radius of the arc being equal to the distance from the surface to the pin 153, and this arcuate surface rests upon the upper surface of a block 165 which is fastened to the base plate 57. The plate 156 has a notch 166 on its right hand side which cooperates with a notch 167 on the left side of the arm 161, as will be explained subsequently. With the parts in the positions shown in Fig. 14, the plate 156 is prevented from moving to the left by the protruding end of the right slide 32 which, it will be recalled, carries the board to be punched and which slides in a groove in the die plate 35, as previously explained.

With the parts in the positions shown in Fig. 14, S2 is actuated. When the die plate 35 is raised (the plates 24, 57, 58 and the block 165 will move as a unit with the die plate), the block 165 will raise the plate 156 against the spring 155 until the notch 166 engages the notch 167, thereby allowing the spring 163 to move the arm 161 to the left which in turn releases the switch S2. In the specific embodiment being described, this operation occurs when the die plate 35 has been raised 0.100 inches. When the die plate 35 comes back down, the notch 167 holds the plate 156 up and the switch S2 is not re-actuated. When the right slide 32 is withdrawn, the plate 156 and the arm 161 are urged to the left by their springs, the notches 166 and 167 disengage, and the plate 156 and plunger 154 drop down. When the right slide 32 is re-inserted, the parts are restored to the positions shown in Fig. 14. In summary, when the die is down and the right slide is all the way in, S2 is actuated. When the die rises 0.100 inch, S2 is released. S2 is not re-actuated until the die has been lowered and the right slide has been withdrawn and re-inserted.

*Switch S1*

The switch S1 is interconnected with the apparatus which actuates the switch S2 and operates similarly, but not identically. The lower right hand edge of plate 156 has a rectangular projection 169 formed integrally therewith and which is twisted through 45° so as to actuate the switch S1. The projection 169 can be seen in cross section in Fig. 14 and can also be seen in small scale in Fig. 13. The operation of the switch S1 can best be understood from Fig. 15, which is a view similar to Fig. 14.

Figure 15:
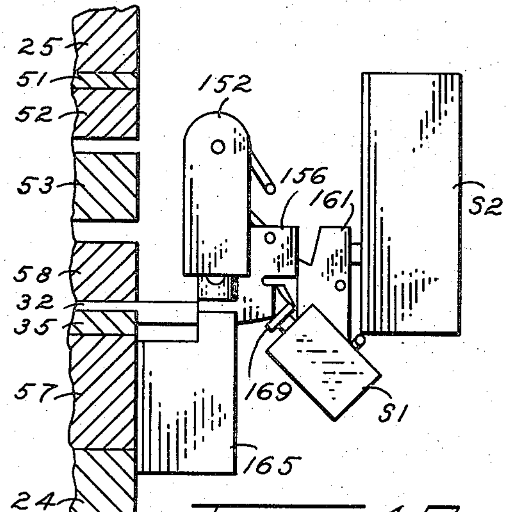
Figure 15 is a view similar to Fig. 14 but taken on a plane near to the corner of the machine, showing the switch S1 and its operating mechanism.

Referring now to Fig. 15, there is shown the switch S1 which, it will be understood, is mounted at an angle of 45° on a portion of the bracket 151. The bracket 151 has been omitted from Figs. 14 and 15 in the interest of clarity since its shape and position are shown clearly in Fig. 13. The switch S1 is a normally closed single-pole single-throw switch and is actuated by the previously mentioned projection 169.

With the parts in the positions shown in Fig. 15, the switch S1 is in its actuated (open) position. When the die plate 35 is raised, the plate 156 and the projection 169 will rise. When the die plate has risen a short distance, say between 0.005 inch and 0.010 inch, the projection 169 will release the pin of the switch sufficiently to allow the contacts to close. When the die plate 35 has risen 0.100 inch, the plate 156 will be latched up, as previously explained, so that when the die plate comes back down the projection 169 will remain up and switch S1 will remain in its unactuated (contacts closed) position. When the right slide 32 is withdrawn, the plate 156 and the arm 161 are urged to the left, the notches disengage, and the plate 156 drops down. Plate 156 is too far to the left for projection 169 to actuate the switch S1 at this time, but reinsertion of the right slide 32 pushes the plate 156 and the projection 169 back to the position shown in Fig. 15, thereby actuating the switch S1 and opening its contacts.

*Switch S3*

The switch S3 is a normally open single-pole single-throw switch which is actuated (contacts closed) when the bar 36 (Figs. 1 and 4) is pulled out so as to withdraw all of the punch locking keys. The switch is mounted on the lower surface of the upper plate 25, as shown in Fig. 13, and is actuated by a lever 171 which cooperates with a detent in the right key guide 72, as shown in Figs. 16 and 17. The lever 171 fits in the space between the spring plate 52 and the body plate 53 and is urged to the left, as viewed in Figs. 16 and 17, by means of a spring 172 which is compressed and placed between an offset portion of the lever 171 and a small plate 173 fastened to the edges of the spring plate 52 and the body plate 53. Several small pins 174 in the body plate 53 allow the lever 171 to move lengthwise only. The lever 171 is urged against the side of the right key guide 72 and when the key guide 72 is fully withdrawn, the lever 171 moves to the left into the detent in the right key guide 72. The right end of the lever 171 extends beyond the edge of the plates of the press, is bent downward, passes under the switch S3, and has an upturned end which operates the switch S3 when the right key guide is withdrawn all the way.

*Switch S4*

The switch S4 is a normally open double-pole single-throw switch which is actuated (contacts closed) when the bar 36 (Figs. 1 and 4) is pushed in all the way so as to engage the punch locking keys with the punches. As shown in Fig. 13, the switch S4 is mounted at the rear of the press on a bracket 176 which in turn is fastened to the upper plate 25. As shown in Fig. 18, it is actuated by the end of the left key guide 177 when fully inserted.

*Switch S5 and the limit stop plates*

As previously explained, there is a space of 0.185 inch between the body plate 53 and the stripper plate 58, which space determines the maximum amount by which the die plate can be raised. During set up, that is, when the punches are being set to their proper positions prior to punching a plurality of boards, the die plate is raised 0.170 inch, while during operation, the die plate is raised only 0.100 inch. In order to limit the rise of the die plate during operation, four limit stop plates are provided which serve as mechanical stops. These plates are each 0.085 inch thick and are inserted, one in each corner of the press, in the space between the body plate 53 and the stripper plate 58. Provision is made for withdrawing the plates during set up when it is necessary to raise the die plate 0.170 inch.

Each limit stop plate is inserted and withdrawn by a rotary solenoid, one of which is shown at 181 in Fig. 13. As best shown in Figs. 19 and 20, the solenoid 181 is mounted on a generally U-shaped bracket 182 which in turn is fastened to the stripper plate 58 and the die plate 35. The solenoid 181 includes a shaft 183 which is fastened to a circular plate 184 to which in turn the limit stop plate 185 is fastened. When the solenoid 181 is deenergized, an internal spring (not shown) urges the parts to the positions shown in Figs. 19 and 20 with the limit stop plate 185 between the body plate 53 and the stripper plate 58. When the solenoid is energized, the shaft 183, the circular plate 184 and the limit stop plate 185 are rotated through 90° thus removing the limit stop plate 185 from the space between the plates 53 and 58 to the position shown in dashed outline in Fig. 19.

The switch S5 is a double-pole single-throw switch with one set of normally open contacts S5*a* and one set of normally closed contacts S5*b* and is mounted in the position indicated in Figs. 13 and 19 by means of a bracket (not shown). The limit stop plate 185 has a projection 186 formed integrally therewith which engages the actuating pin of the switch S5 when the plate 185 is between the plates 53 and 58, as shown in Fig. 19.

*Switches S6 and S7*

The switches S6 and S7 are each single-pole single-throw switches which are actuated when the die plate is all the way down and when it is up 0.170 inch respectively. As shown in Fig. 13, switches S6 and S7 are mounted on the rear edge of the upper plate 25 and are actuated by a bracket 191 which is fastened to the die plate 35 and the stripper plate 58 so as to move up and down with them. The bracket is angled so as to pass behind the switch S6 and the upper portion has two inwardly projecting forks 192 and 193 which actuate S6 and S7 respectively, as shown more clearly in Fig. 21.

*Electrical control circuit*

The circuit for controlling the operation of the press is shown in Fig. 22. The circuit includes the switches S1–S7, the up and down solenoids 144 and 145, the limit stop solenoid 181, a manually operable "set up—operate" switch 201, several pilot lights, and the manually operable push button up and down switches 202 and 203. These latter switches are mechanically interlocked so that when one of them is pushed down to close its contacts, the other one is raised.

The power lines are connected through a main power switch 204 to two conductors, 205 and 206. The conductor 205 is connected to the movable arm of the switch 201 which has two fixed contacts 207 and 208. The fixed contact 208 is connected to the movable arm of switch S2 and also to the pilot light 209, the other terminal of which is connected to the conductor 206. The upper fixed contact 211 of switch S2 is connected, through the upper contacts S5*a* of switch S5 and the upper contacts S4*a* of switch S4 to one terminal of the "up" solenoid 144, the other terminal of which is connected to the common conductor 206. The lower fixed contact 212 of the switch S2 is connected through the contacts of switch S1 to one terminal of the "down" solenoid 145 the other terminal of which is connected to the common conductor 206.

The lower fixed contact 207 of the switch 201 is connected to the pilot light 213 and is also connected through the lower contacts S4*b* of switch S4 and the contacts of the "down" switch 203 to the "down" solenoid 145. The contact 207 is also connected through the contacts of switch S3 to one terminal of the limit stop solenoid 181, the other terminal of which is connected to the conductor 206. It will be understood that although but one limit stop solenoid is shown in Fig. 22, four are required and the remaining three are connected in parallel with solenoid 181. Lastly, contact 207 is connected through the contacts of the "up" switch 202 and the lower contacts S5*b* of switch S5 to the "up" solenoid 144.

The conductor 205 is connected through the contacts of switch S6 to the green pilot light 214 and is also connected through the contacts of switch S7 to the red pilot light 215.

*Operation of electrical circuit*

*Operate cycle*

The operating cycle will be considered first and it is assumed that the punches have previously been set and locked into their proper positions, the die plate is all the way down (with the piston 143 resting on the stop 147 of Fig. 12), and the slides for holding the printed circuit board are all the way out. Fig. 22 shows the switches S1—S7 in the positions they would have under these conditions. In order to punch a blank board, the following steps are performed.

(1) Close main power switch 204. This lights the green pilot light.

(2) Turn the switch 201 to its "operate" position. This lights the pilot light 209.

(3) Place blank card on slides 32 and 33.

(4) Push handle 34 (which joins slides 32 and 33—see Fig. 1) all the way in. This actuates S1, opening its contacts thus de-energizing the "down" solenoid 145. S2 is next actuated to its "up" position so that its movable arm makes contact with the fixed contact 211. Since the limit stop bars are in place, contacts S5a are closed and contacts S4a are closed because the punch locking keys are all the way in. Therefore, as soon as S2 is actuated, the "up" solenoid 144 is energized and the die plate starts moving up.

As the die plate starts to move up, S6 is opened, extinguishing the green light. When the die plate has moved between 0.005 and 0.010 inch, S1 is released, closing its contacts, but this has no effect at this time because S2 is in its "up" position. When the die plate has moved up 0.100 inch, the piercing action is completed and S2 is thrown to its "down" position, making contact with fixed contact 212 and deenergizing the "up" solenoid 144. Since S1 is already closed, the "down" solenoid is energized at once and the die plate comes back down. When it is all the way down, S6 is closed, illuminating the green light.

(5) Withdraw the handle 34 and remove the pierced board. The switches are again in the positions shown in Fig. 22 and the operation may be repeated with another blank board.

*Set up operation*

Let is be assumed that it is desired to change the pattern of holes being punched, that the last of the old style boards has been removed, the bar 34 and slides 32 and 33 are all the way out, and that the die is in its down position. The switches S1—S7 will then be in the positions shown in Fig. 22 and the sequence of operations will be as follows:

(1) Move the "Set up—operate" switch 201 to its "set up" position. This will extinguish the lamp 209 and illuminate the lamp 213.

(2) Insert the new sample board, or template, on the slides 32 and 33.

(3) Push the handle 34 all the way in. S1 and S2 will thereby be actuated but this is of no concern during "set up" because switch 201 is in its "set up" position.

(4) Pull out bar 36 (Figs. 1 and 4) all the way to release the punch locking keys. As the left key guide 177 (Fig. 18) starts to move, S4a and S4b are both opened. S4a disables the operating cycle circuit to prevent automatic operation unless the locking keys are fully inserted. S4b opens the circuit to the "down" solenoid 145. When the bar 36 is withdrawn all the way, S3 is closed thereby completing the circuit to the limit stop solenoid 181 thus withdrawing all four of the limit stop plates (such as plate 185 of Figs. 19 and 20) so as to allow the die plate to rise more than 0.100 inch. When the limit stop plates are withdrawn, S5a is opened thus further disabling the "up" portion of the "operate" cycle. Contacts S5b close the circuit from the "up" switch 202 to the "up" solenoid 144.

(5) Push the "up" button 202. This energizes the "up" solenoid 144 and the die plate starts moving up. As it moves up, S6 is opened, extinguishing the green light 214. When the die plate has moved up 0.170 inch, the piston 143 (Fig. 12) will bear against stop 146, arresting its motion, and S7 will be closed, illuminating the red light 215.

(6) Push bar 36 all the way in. This locks the punches in position, as previously explained. As soon as the right key guide 72 leaves its fully out position, S3 is opened. This breaks the circuit to the limit stop solenoids, whereupon the internal springs urge the limit stop plates back into place. However, the space between plates 53 and 58 is now only about 0.015 inch so the limit stop plates merely bear against the edges of the plate 53 at this time. When the left key guide 177 reaches its fully in position, both sets of contacts of S4 are closed. S4a partially restores the "operate" to the "up" solenoid 144 while S4b completes the circuit from the contact 207 to the "down" switch 203.

(7) Push the "down" button 203. This completes the circuit to the "down" solenoid 145 and the die starts to move down, opening S7 and extinguishing the red light. When the die reaches its 0.100 inch position the limit stop plates are drawn into the space between the plates 53 and 58, and S5 is actuated. Closure of S5a restores the operate cycle circuit to the "up" solenoid 144 while the opening of S5b disables the set up circuit to the "up" solenoid 144. When the die plate is all the way down, S6 is closed illuminating the green light.

(8) Pull out bar 34 and remove the sample board.

(9) Move the "Set up—operate" switch 201 to its "operate" position. The switches will now be in the positions shown in Fig. 22 and the machine is ready for the "operate" cycle.

*Conclusion*

From the foregoing it is seen that applicant has invented an extremely useful apparatus. As far as applicant is aware, there is no other machine capable of punching all of the required holes in a printed circuit board with a field 6 inches by 8 inches in a single operation and which at the same time can be adjusted to a new configuration of holes so quickly and simply. As far as the operator is concerned, the steps can be simplified considerably. Assuming that the die is down and the handle 34 is all the way out, the steps are as follows:

*Set up*

(1) Move switch 201 to "Set Up" position.
(2) Insert sample board on slides.
(3) Push handle 34 all the way in.
(4) Pull bar 36 all the way out.
(5) Push "up" button and wait for red light.
(6) Push bar 36 back in.
(7) Push "down" button and wait for green light.
(8) Pull out handle 34 and remove sample board.

*Operate*

(1) Move switch 201 to "operate" position.
(2) Place blank board on slides.
(3) Push handle 34 all the way in and wait for green light to go out and come back on again.
(4) Pull out handle 34 and remove pierced board.

Although a specific embodiment has been described in considerable detail, it will be understood that many modifications may be made within the scope of the invention. It is therefore desired that the invention be limited only by the true scope of the appended claims.

What is claimed is:

1. Perforating apparatus comprising a plurality of punches arranged in a pattern, a die having a plurality of apertures arranged in a like pattern, each of said punches having locking surfaces formed thereon, a plurality of punch locking keys cooperating with said locking surfaces, slide means for inserting a work piece between said die and said punches, power actuated means responsive to the insertion of said slide means for moving said die and said punches toward each other a predetermined distance and back again, and means responsive to the disengagement of said locking keys with said locking surfaces for disabling said power actuated means.

2. Perforating apparatus comprising a plurality of punches arranged in a grid pattern, a die below said punches having a plurality of apertures each of which is coaxial with one of said punches, locking surfaces formed on each of said punches, a plurality of punch locking keys cooperating with said locking surfaces for locking each punch in either an active or an inactive position, slide means for inserting a work piece to be perforated between said die and said punches, power actuated means responsive to the insertion of said slide means for first raising said die a predetermined distance and then lowering it, and means responsive to the disengagement of said locking keys with said locking surfaces for disabling said power actuated means.

3. Perforating apparatus comprising a plurality of punches arranged in a pattern, a die having a plurality of apertures arranged in a like pattern, means for inserting a template between said die and said punches, means for moving said die and said punches toward each other a predetermined distance whereby certain punches encounter said template and assume a first position while the remaining punches assume a second position, and means for locking said punches while said die and said punches are in their moved positions.

4. Perforating apparatus comprising a plurality of punches arranged in a pattern, a die below said punches having a plurality of apertures arranged in a like pattern, means for inserting a template between said die and said punches, means for raising said die a predetermined distance whereby certain punches are raised by said template to an inactive position while the balance remain in an active position, and means for locking said punches in their then attained positions while said die is in its raised position.

5. Perforating apparatus comprising, a plurality of punches arranged in a pattern, a die having a plurality of apertures arranged in a like pattern, a plurality of springs each urging one of said punches toward said die, means for inserting a template having the desired configuration of apertures between said die and said punches, means for moving said die and said punches toward each other whereby each punch encountering an aperture in said template will extend therethrough and remain in an active position while the remaining punches will be moved by the template against the urging of said springs to an inactive position, and means for locking said punches in their respective active and inactive positions.

6. Perforating apparatus comprising a plurality of punches arranged in a predetermined pattern, a die below said punches having a plurality of apertures each of which is coaxial with one of said punches, means for inserting a template having the desired configuration of apertures between said die and said punches, means for raising said die whereby each punch encountering an aperture in said template will extend therethrough and remain in an active position while the remaining punches will be raised to an inactive position, and means for locking said punches in their respective active and inactive positions.

7. Perforating apparatus comprising a plurality of punches arranged in a pattern, a die having a plurality of apertures arranged in a like pattern, locking surfaces on each of said punches, a plurality of springs each urging one of said punches toward said die, means for inserting a template having the desired configuration of holes between said die and said punches, means for moving said die and said punches toward each other whereby each punch encountering a hole in said template will pass therethrough and remain in an active position while the remaining punches will be moved by the template against the urging of said springs to an inactive position, and means for engaging a plurality of punch locking keys with said locking surfaces so as to lock said punches in their selected active or inactive positions.

8. Perforating apparatus comprising a plurality of punches arranged in a grid pattern, a die having a plurality of apertures arranged in a like pattern, locking surfaces formed on each of said punches, a plurality of punch locking keys each cooperating with the locking surfaces on a plurality of said punches for locking each punch in either an active or an inactive position, means for engaging and disengaging said locking keys, a plurality of springs each urging one of said punches toward said die, means for inserting a template having the desired configuration of apertures between said die and said punches, and means operative only when said locking keys are disengaged for moving said die and said punches a predetermined distance toward each other whereby each punch encountering an aperture in said template will pass therethrough and remain in its active position while each remaining punch will be moved by the template against the urging of its spring to its inactive position.

9. Perforating apparatus comprising a plurality of punches arranged in a grid pattern, a die below said punches having a plurality of apertures coaxial with said punches, locking surfaces on each of said punches, a plurality of punch locking keys cooperating with said locking surfaces for locking each punch in either an active or an inactive position, means for engaging and disengaging said punch locking keys, a plurality of springs each urging one of said punches downward, slide means for inserting a template between said die and said punches, power actuated means for raising said die a predetermined distance whereby those punches encountering the surfaces of the template are raised thereby against the urging of their springs to their inactive positions while those punches encountering an aperture in said template remain in their active positions, and means responsive to the engagement of said locking keys for disabling said power actuated means.

10. Perforating apparatus comprising a plurality of punches arranged in a pattern, a die having a plurality of apertures arranged in a like pattern, means for preselecting any one of a plurality of distances by which said punches and said die may be moved toward each other, and means for moving said die and said punches toward each other whichever distance is preselected.

11. Perforating apparatus comprising a plurality of punches arranged in a pattern, a die below said punches having a plurality of apertures coaxial with said punches, means for preselecting any one of a plurality of distances by which said die may be raised, and means for raising said die whichever distance is preselected.

12. Perforating apparatus comprising a plurality of punches arranged in a pattern, a die having a plurality of apertures arranged in a like pattern, means for preselecting either of two distances by which said punches and said die may be moved toward each other, and means for moving said die and said punches toward each other whichever distance is preselected.

13. Perforating apparatus comprising a plurality of punches arranged in a pattern, a die having a plurality of apertures arranged in a like pattern, locking surfaces formed on each of said punches, a plurality of punch locking keys cooperating with said locking surfaces for locking each punch in an active or an inactive position, means for engaging and disengaging said punch locking keys, means operative only when said locking keys are disengaged for moving said die and said punches toward each other a first predetermined distance and means operative only when said locking keys are engaged for moving said die and said punches toward each other a second predetermined distance which is less than said first distance.

14. Perforating apparatus comprising a plurality of punches arranged in a grid pattern, a die having a plurality of apertures arranged in a like pattern, each of said punches having locking surfaces formed thereon, a plurality of punch locking keys each cooperating with the locking surfaces on a plurality of said punches for locking each punch in either an active or an inactive position, means for engaging and disengaging said locking keys, a plurality of springs each urging one of said punches toward said die when said locking keys are disengaged, means for inserting a template having the desired configuration of apertures between said die and said punches, means for moving said die and said punches toward each other a first predetermined distance only when said locking keys are disengaged whereby each punch encountering an aperture in said template will extend therethrough and remain in its active position while the remaining punches will be moved against their respective springs to an inactive position, means for automatically moving said die and said punches toward each other a second predetermined distance and back again in response to insertion of a work piece between said die and said punches, and means for disabling said automatic means when said locking keys are disengaged.

15. Perforating apparatus comprising a plurality of punches arranged in a grid pattern, locking surfaces on said punches, a plurality of punch locking keys cooperating with said locking surfaces for locking said punches in either an active or an inactive position, means for engaging and disengaging said locking keys, a die below said punches having a plurality of apertures each of which is coaxial with one of said punches, a plurality of springs each urging one of said punches downward, means for raising said die a first predetermined distance, mechanical stop means normally limiting the upward movement of said die to said first predetermined distance, means responsive to the disengagement of said punch locking keys for rendering said stop means ineffective, and means for raising said die a second predetermined distance which is greater than said first distance.

16. Perforating apparatus comprising a plurality of punches arranged in a grid pattern, a die below said punches having a plurality of apertures each of which is coaxial with one of said punches, locking surfaces formed on each of said punches, a plurality of punch locking keys cooperating with said locking surfaces for locking said punches in either a downward active position or in an upward inactive position, means for engaging and disengaging said punch locking keys with said locking surfaces, a plurality of springs each of which urges one of said punches downward toward said die, slide means for inserting a work piece between said die and said punches, means responsive to the insertion of said slide means for raising said die a first predetermined distance and then lowering it, mechanical stop means normally limiting the upward movement of said die to said first predetermined distance, means responsive to the disengagement of said punch locking keys for rendering said stop means and said slide responsive means ineffective, and means for raising said die a second predetermined distance which is greater than said first distance.

17. Perforating apparatus comprising a plurality of punches arranged in a pattern, a die having a plurality of apertures arranged in a like pattern, locking surfaces formed on each of said punches, means cooperating with said locking surfaces for locking each punch in either an active or an inactive position, means for positioning a work piece between said die and said punches, and means responsive to the positioning of a work piece for moving said die and said punches toward each other a predetermined distance and back again.

18. Perforating apparatus comprising a plurality of punches arranged in a grid pattern, a die below said punches having a plurality of apertures each of which is coaxial with one of said punches, locking surfaces formed on each of said punches, a plurality of punch locking keys cooperating with said locking surfaces for locking each punch in either an active or an inactive position, means for positioning a work piece to be perforated between said die and said punches, and means responsive to the positioning of a work piece for first raising said die a predetermined distance and then lowering it.

References Cited in the file of this patent

UNITED STATES PATENTS

| | | |
|---|---|---|
| 1,902,064 | Ford | Mar. 21, 1933 |
| 1,934,934 | Lorant | Nov. 14, 1933 |
| 2,177,788 | Ross | Oct. 31, 1939 |
| 2,180,058 | Jones | Nov. 14, 1939 |
| 2,192,626 | Von Pein | Mar. 5, 1940 |
| 2,225,313 | McCart | Dec. 17, 1940 |
| 2,248,136 | Swanson | July 8, 1941 |
| 2,607,421 | Anderson | Aug. 19, 1952 |